Dec. 9, 1958 C. R. CUMMINGS 2,863,653
APPARATUS FOR INTRODUCING GAS INTO WATER
Filed May 8, 1957 2 Sheets-Sheet 1

INVENTOR
CHARLES R. CUMMINGS
BY
ATTORNEY

Dec. 9, 1958    C. R. CUMMINGS    2,863,653
APPARATUS FOR INTRODUCING GAS INTO WATER
Filed May 8, 1957    2 Sheets-Sheet 2
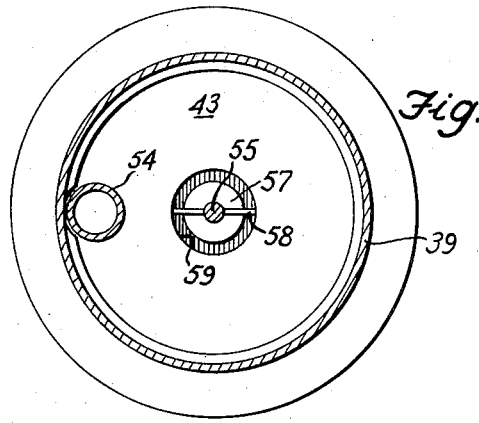
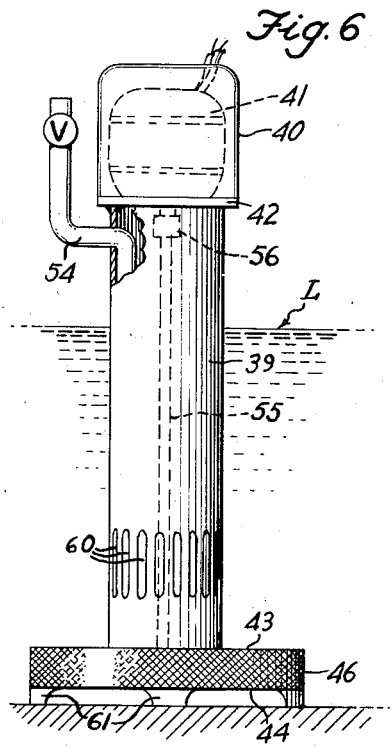
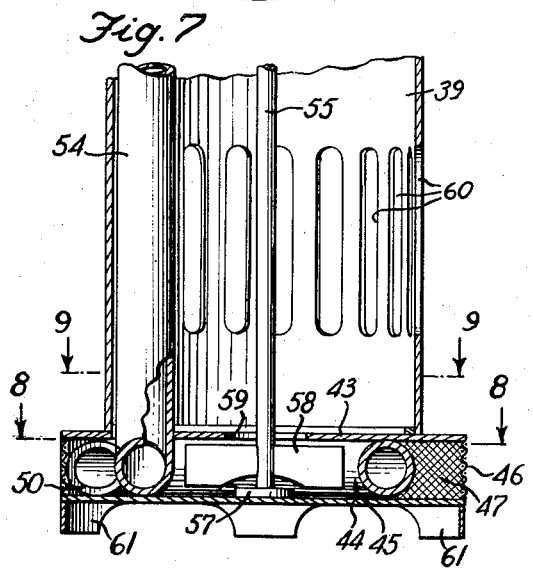
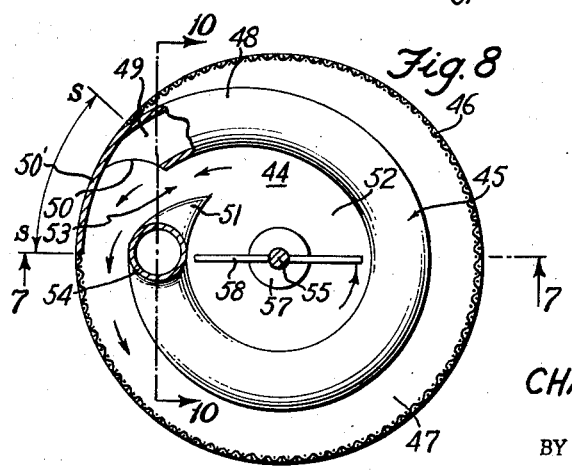
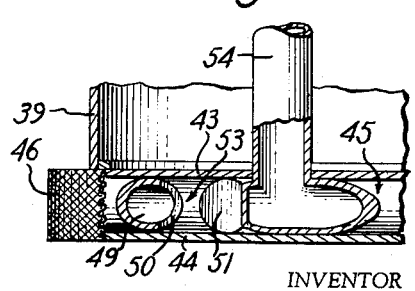
INVENTOR
CHARLES R. CUMMINGS
BY
ATTORNEY

United States Patent Office 2,863,653
Patented Dec. 9, 1958

2,863,653

APPARATUS FOR INTRODUCING GAS INTO WATER

Charles R. Cummings, Drexel Hill, Pa.

Application May 8, 1957, Serial No. 657,902

3 Claims. (Cl. 261—36)

My invention relates to an apparatus for introducing a gas, such as air, or air with other gaseous chemicals, into a body of water to mix the same.

An important object of the invention is to provide means for circulating the water and causing a portion thereof to travel in a circular path and utilizing the circular travel of the water for creating suction for drawing in the gas into the water, below the level of the water.

A further object of the invention is to provide means of the above-mentioned character which may be arranged near the bottom of the water mass for effecting the agitation of the water and the introduction of the gas into the same.

A further object of the invention is to provide apparatus of the above-mentioned character which may be attached to the side of the tank holding the water.

A further object of the invention is to provide apparatus which may be mounted upon the bottom of the tank.

Other objects and advantages of the invention will be apparent during the course of the following description.

In the accompanying drawings forming a part of this application and in which like numerals are employed to designate like parts throughout the same, Figure 1 is a side elevation of apparatus embodying my invention, parts broken away and parts in section, showing the same applied to the side of a tank.

Figure 6 is a side elevation of apparatus embodying a second form of the invention, parts broken away and parts in section.

Figure 7 is a central vertical longitudinal section through the main casing of the apparatus, parts broken away, taken on line 7—7 of Figure 8.

Figure 8 is a horizontal section taken on line 8—8 of Figure 7.

Figure 9 is a horizontal section taken on line 9—9 of Figure 7.

Figure 10 is a vertical section taken on line 10—10 of Figure 8.

Figure 4:
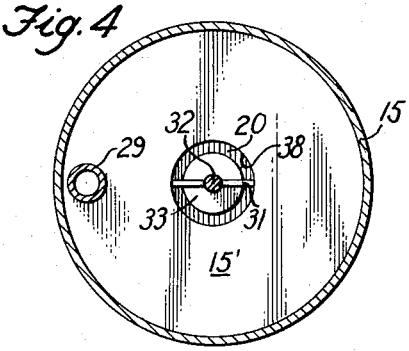
Figure 4 is a horizontal section taken on line 4—4 of Figure 2.

Attention being called first to Figures 1 to 5 inclusive, the numeral 10 designates a horizontal housing which may be provided with clamping means 11, so that it can be mounted upon the side of a water tank 12. This housing has mounted therein a motor 13.

The housing 10 includes a floor or bottom wall 14, having a vertical main cylindrical casing 15 rigidly secured thereto. The upper end of this casing is closed by the bottom wall 14.

The vertical casing 15 has a bottom 15' rigidly secured thereto. This vertical casing extends below the water level and terminates near the bottom of the tank 12. The casing 15 is provided near and spaced from its lower end with elongated vertical spaced water inlet openings or slots 16.

Means are provided to form a suction chamber 17 beneath the main casing 15. This means includes a vertical side wall 18, arranged beneath the bottom 15' of the main casing 15 and above a lower or outer bottom 20 and rigidly secured to these bottoms. The outer bottom 20 is circular and has the same diameter as the main casing 15 and extends radially beyond the side wall 18. The bottom 20 is vertically spaced from the bottom 15', forming an outer chamber 21, which surrounds the suction chamber 17. The outer side of the outer chamber 21 is cylindrical and is covered by a fine screen 22, attached to the casing 15 and the bottom 20, by any suitable means. The screen 22 forms the outer side of the chamber 21, as shown. The side wall 18 of the suction chamber 17 is cylindrically curved throughout the major portion of its circumference and this cylindrically curved portion is concentric with the screen 22. The side wall 18 has a portion 23 which is in the form of an involute curve and extends radially outwardly beyond the major portion of the side wall 18, and has a free end separate from the side wall and overlapping the same for producing a somewhat restricted nozzle 24, as shown. The nozzle 24 is arranged generally at a tangent to the side wall 18, as shown. Secured to the involute portion 23 is a shield 25, connecting the bottoms 15' and 20, and this shield covers a portion of the screen 22 between the points S—S and near the tangent nozzle 24 and the shield extends circumferentially of the nozzle, with respect to the direction of travel of the water within the suction chamber 17, as shown. The shield 25 has its forward end open while its rear end is closed by the portion 26 of the shield 25, forming a chamber 27, closed at its top and bottom but open at its forward end, as indicated at 28.

Figure 1:
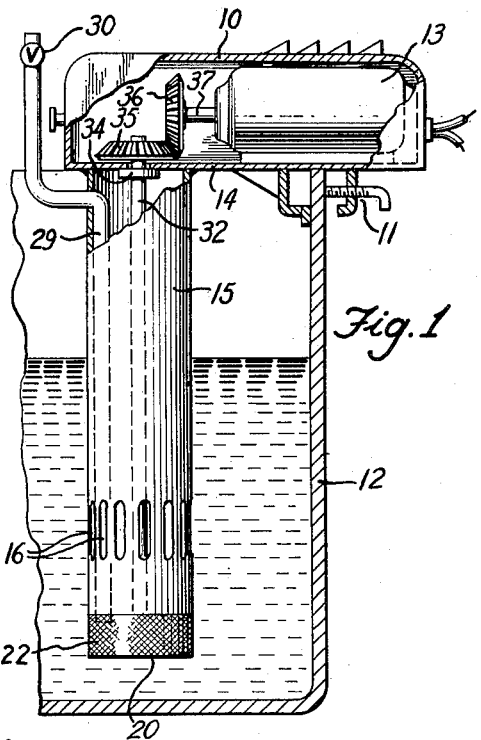
Figure 2:
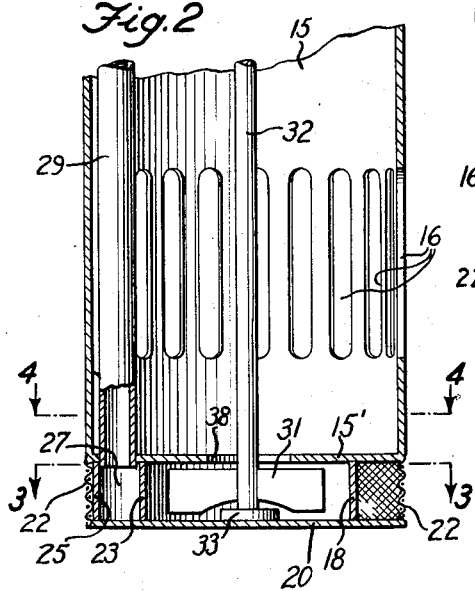
Figure 2 is a central vertical longitudinal section through the main casing section of the apparatus, upon an enlarged scale and parts broken away, taken on line 2—2 of Figure 3.
Figure 3:
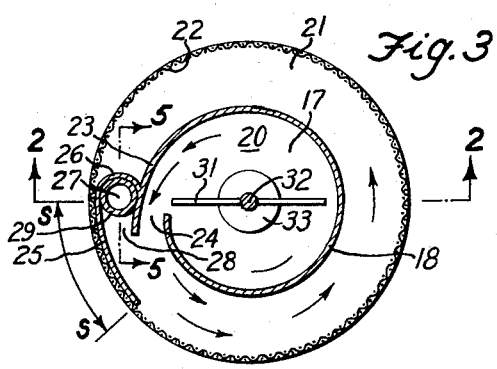
Figure 3 is a horizontal section taken on line 3—3 of Figure 2.
Figure 5:
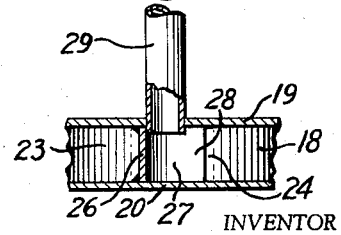
Figure 5 is a vertical section taken on line 5—5 of Figure 3.

A vertical air supply pipe 29 extends through the main casing 15 and leads into the chamber 27. This air supply pipe extends at its upper end to the exterior of the main casing 15, as shown in Figure 1, and may extend above the housing 13 and is provided with a valve 30 which may be manipulated to control the passage of gas or air through the pipe 29. The pipe 29 has its upper intake end in communication with the atmosphere or a source of gas.

Arranged within the suction chamber 16 is a horizontal rotatable centrifugal fan or propeller 31, rigidly mounted upon a vertical shaft 32, the lower end of which engages within a bearing 33, mounted upon the bottom 20. The upper end of the shaft 32 is journaled in a bearing 34, secured to the bottom 14. A horizontal bevel gear 35 is rigidly mounted upon the upper end of the shaft 32 and engages a vertical bevel gear 36, mounted upon the armature shaft 37 of the motor 13. The bottom 15' has a large central opening 38 formed therein, surrounding the shaft 32, and the fan or propeller 31 extends radially beyond the opening 38, as shown.

The operation of this form of the invention is as follows:

When the apparatus is applied to the tank 12, as shown in Figure 1, the lower end of the main casing 15 extends below the level of the water in the tank, as shown. The motor 13 is now set into action and this will rotate the centrifugal fan or propeller at a suitably high speed, such as 1500 R. P. M. The water will pass through the openings 16 into the main casing 15 and through the opening 38 into the suction chamber 17 and be set into rapid rotation within the suction chamber 17, in the direction of the arrow, causing the water to move outwardly by centrifugal force at a tangent through the nozzle 24. The water also travels circumferentially within the outer chamber 21 and will pass radially outwardly through the outer screen 22 and be returned to the tank. The circumferential high travel of the water through the nozzle 24, at substantially a tangent to the circumference of the chamber 21, and close to and across the open end 28 of the chamber 27, sets up a suction or vacuum within the chamber 27, which draws air into the chamber 27, or a mixture of air and gasses, through the pipe 29. The outer chamber 21 is of large circumferential area, and is covered at its periphery by the fine screen 22, and this causes the incoming water and gas to circulate throughout substantially the entire circumferential length of the chamber 21, when discharging through the fine screen 22, in the intimate mixing of the gas and water. The air is discharged through the open end 28 of the chamber 27 into the chamber 21, into the presence of the water traveling within the chamber 21. The air or gas becomes thoroughly mixed with the water. The term "gas" is used in a broad sense and is intended to cover air or a mixture of air and any gaseous chemicals.

The second form of the invention is shown in Figures 4 to 9 inclusive. In these figures, the numeral 39 designates a main vertical casing, to be arranged within the tank holding the water or the like and supported from the bottom of the tank. A housing 40 is rigidly mounted upon the upper end of the casing 39 and encloses a motor 41, suitably mounted upon the bottom 42 of the housing 40.

Arranged beneath the lower end of the main casing 39 is a bottom 43, formed of sheet metal or the like and rigidly secured to the casing 39. Arranged beneath this bottom 43 is a second or outer bottom 44. The bottoms 43 and 44 are rigidly connected with a curved horizontal suction pipe 45 by welding or the like. This pipe will be further described.

Connecting the bottoms 43 and 44 at their peripheries is a fine screen 46 forming an outer surrounding chamber 47. This connection may be effected by soldering the screens to the bottoms 43 and 44. The horizontal pipe 45 is circularly curved throughout the major portion of its circumference and has a portion 48, which is in the form of an involute curve, extending radially outwardly toward its free end. This pipe 45 forms an air suction chamber 49. The outer end of the chamber 49 is open, as shown at 50, while its inner end tapers to a point and is closed, as shown at 51. The curved pipe 45 forms an inner suction chamber 52, having a discharge opening 53, arranged generally at a tangent to the chamber 52 and the discharge opening 50 of the chamber 49. The pipe 45 not only supplies air to the chamber 49, but provides an economical construction when the outside diameter of the bottoms 43 and 44 extend radially beyond the casing 39, and the pipe 45 also forms a partition to produce the inner suction chamber 52 and the outer chamber 47.

A vertical air inlet pipe 54 leads into the pipe 45, adjacent to its closed end and this pipe 54 extends upwardly and passes through the main casing 39 and may extend to a point above the housing 40. The upper open end of the pipe 54 is in communication with the atmosphere or a source of gas. The pipe 54 has a control valve connected therein.

Arranged within the main casing 39 is a vertical shaft 55, the upper end of which is connected with the armature shaft of the motor by means of a coupling 56. The lower end of this shaft is journaled in a bearing 57, secured to the bottom 44. The shaft 55 has a centrifugal fan or propeller 58 rigidly secured thereto and this fan or propeller operates within the suction chamber 52. The shaft 55 passes through a large opening 59 in the bottom 43 and the fan or propeller 58 extends radially beyond the opening 59. The casing 39 has an annular set of elongated openings 60 which are spaced as shown, for the flow of the water into the casing 39.

An imperforate plate 50' extends around the chamber 47 between the points S—S covering the screen. This imperforate plate leads to and is connected with the bottoms 43 and 44. The imperforate plate extends forwardly beyond the discharge opening 50 for a substantial distance and is cylindrically curved, corresponding to the curvature of the screen 46. The imperforate plate guides the incoming water and air circumferentially so that they will properly enter the chamber 47.

The bottom 44 has feet 61, which rest upon the bottom of the tank. The lower portion of the casing 39 is submerged in the water as indicated in connection with the casing 15, Figure 1.

The operation of the second form of the invention is as follows:

The water level may be indicated at L. When the motor is started, the fan or propeller 58 is driven at a high speed, in the direction of the arrow, Figure 8. This rotating fan rotates the water at a high speed in the suction chamber 52 and causes the water to pass outwardly at a tangent through the nozzle or opening 53 into the outer chamber 47, as indicated by the arrows. This discharge of the water from the suction chamber 52 creates a suction therein and further water is drawn in through the openings 60 and passes through the opening 59 into the suction chamber. The rapid travel of the water at a tangent across the outlet opening 50 of the outer suction chamber 49, creates a suction within the outer chamber 49 and air is drawn in through the pipe 54, and circulates through the pipe 45 or chamber 49 and discharges through the outlet opening 50, into the outer chamber 47 and becomes mixed with the water and travels with this water, which passes radially through the screen 46 and is returned to the water within the tank. Instead of supplying air to the water, as indicated, I may supply any gas, or a mixture of air and any chemical gasses.

It is to be understood that the forms of my invention herewith shown and described are to be taken as preferred examples of the same, and that various changes in the shape, size and arrangement of parts may be resorted to, without departing from the spirit of my invention or the scope of the subjoined claims.

Having thus described my invention, I claim:

1. Apparatus for introducing gas into water, comprising an upstanding casing including a first bottom, said bottom having an inner opening, said casing having water inlet opening means arranged above said bottom, a second bottom arranged beneath the first bottom in spaced relation, an upstanding wall arranged between the first and second bottoms and connected therewith, said wall having a substantially circularly curved portion and an involute portion forming therewith a nozzle, said wall forming a suction chamber having communication with the opening in the first bottom, said suction chamber having communication with said nozzle, a centrifugal fan operating within the suction chamber, means to drive the fan, a gas supply chamber arranged outwardly of and near the nozzle and having its outlet opening facing in the same direction with the discharge of the nozzle, a gas supply pipe leading into the gas supply chamber, and a foraminous element surrounding the wall in spaced relation and forming therewith an outer chamber.

2. Apparatus for introducing gas into water, comprising an upstanding casing including a bottom, said bottom having an inner opening, said casing having water inlet opening means arranged above said bottom, a second bottom arranged beneath the first bottom in spaced relation, a pipe arranged between said bottoms and having a circularly curved portion spaced from the outer edges of said bottoms and an involute portion forming an inner nozzle, said pipe forming with said bottoms an inner suction chamber having communication with the opening in the first bottom and said inner nozzle, a foraminous element extending about the pipe and connected with said bottoms and forming therewith an outer chamber, the free end of the involute portion of the pipe forming a second nozzle extending in the same direction with the nozzle of the suction chamber, an imperforate element extending across both nozzles, a gas supply pipe leading into the first-named pipe, a centrifugal fan arranged within the suction chamber, and means to drive the fan.

3. Apparatus for introducing gas into water, comprising a substantially cylindrical upstanding casing having its lower portion arranged beneath the water level of an outer casing, said upstanding casing having inlet openings near its lower end, said upstanding casing including a first bottom having an inner opening, a second bottom arranged beneath the first bottom and spaced therefrom, an element arranged between the first and second bottoms and connected therewith, said element including a substantially circularly curved portion and an outer involute portion, said circularly curved portion and involute portion forming an inner nozzle, said element forming with said bottoms an inner suction chamber communicating with the upstanding chamber through the opening in said bottom and also communicating with the inner nozzle, said element also forming with the first and second bottoms an outer chamber surrounding said element, a screen covering the major portion of the circumference of the outer side of the outer chamber, an imperforate element covering a relatively short portion of the outer side of the outer chamber and arranged adjacent to and extending circumferentially across the inner nozzle, a gas supply pipe for supplying gas into the upstanding casing inwardly of and next to the imperforate element, a centrifugal fan arranged within the inner suction chamber, and means to drive the fan.

References Cited in the file of this patent

UNITED STATES PATENTS

| | | |
|---|---|---|
| 1,124,853 | Callow | Jan. 12, 1915 |
| 1,374,445 | Greenawalt | Apr. 12, 1921 |
| 2,189,779 | Daman | Feb. 13, 1940 |
| 2,352,767 | Booth et al. | July 4, 1944 |
| 2,590,581 | Shirley | Mar. 25, 1952 |
| 2,725,062 | Vile | Nov. 29, 1955 |